Patented Aug. 4, 1942

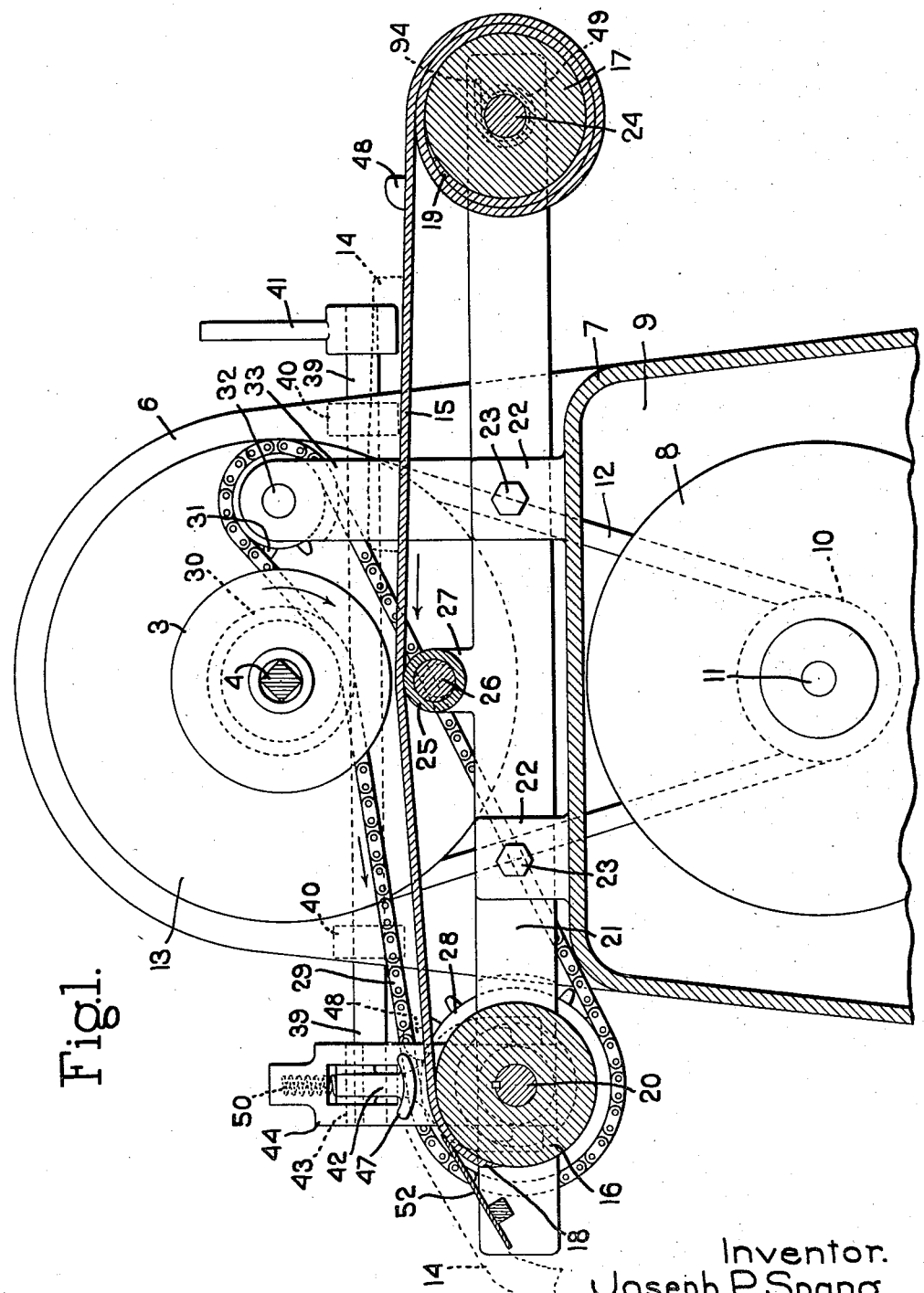

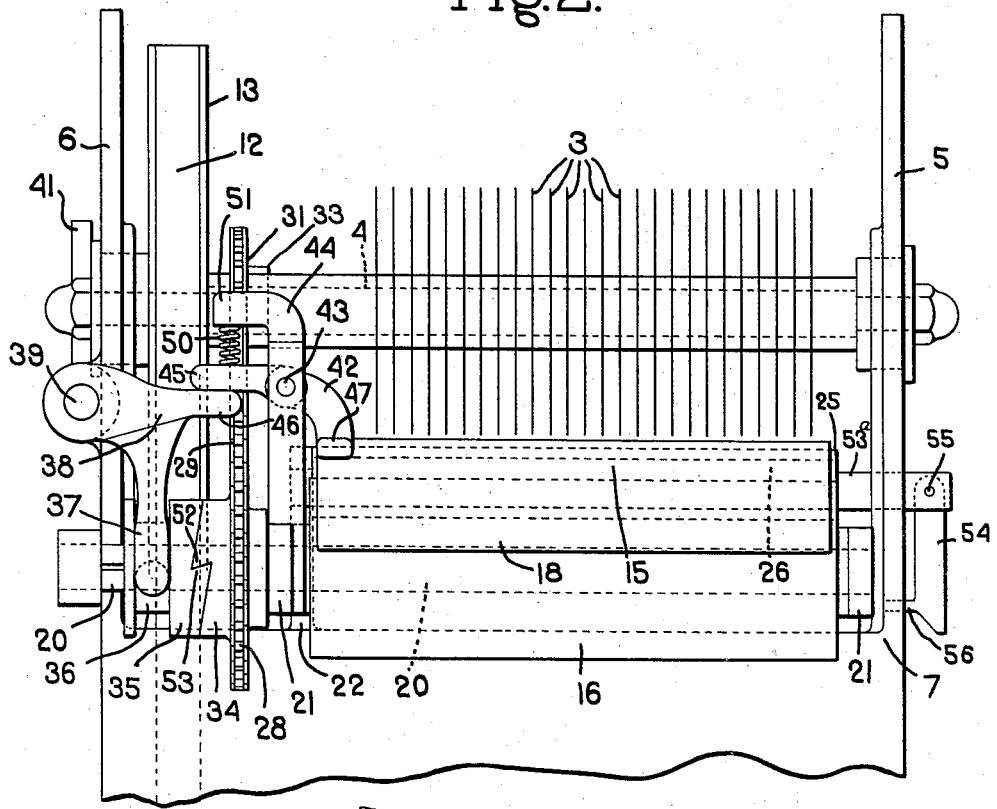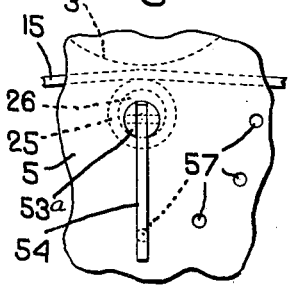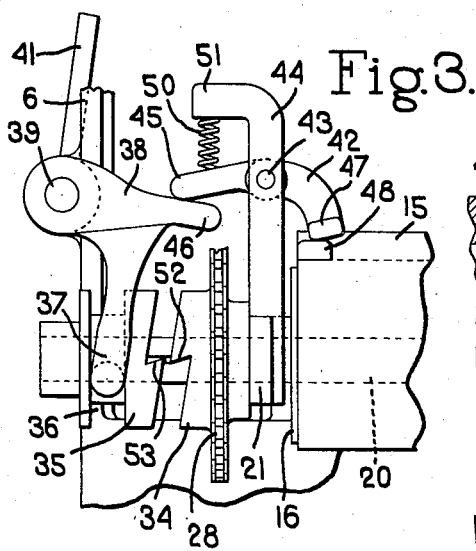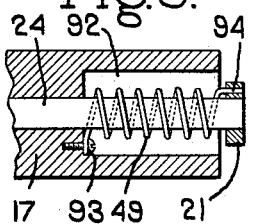

2,291,925

UNITED STATES PATENT OFFICE 2,291,925

MEAT SLITTING MACHINE

Joseph P. Spang, Quincy, Mass., assignor to Cube Steak Machine Company, Inc., Boston, Mass., a corporation of Massachusetts Application December 30, 1939, Serial No. 311,903

10 Claims. (Cl. 17—25)

This invention relates to meat-slitting machines of that type which comprises a set of rotary slitting knives and a reciprocatory supporting member for feeding to the knives a slice of meat to be slit.

One object of the present invention is to provide a novel construction including a spring or its equipment which acts on the meat-supporting member in opposition to its feeding movement and which operates automatically to return the meat-supporting member to initial position after the slice has been delivered to the knives.

Other objects of the invention are to provide various improvements in meat-slitting machines which will be hereinafter set forth.

In the drawings, wherein I have illustrated some embodiments of my present invention:

Fig. 1 is a vertical sectional view through a meat-slitting machine embodying my invention.

Fig. 2 is an end view of Fig. 1.

Fig. 3 is a fragmentary view illustrating the manner of releasing the meat-supporting member after its forward movement so as to permit the spring to return said member to initial position.

Fig. 4 is a fragmentary view illustrating the manner of adjusting the meat-supporting member relative to the knives.

Fig. 5 is a fragmentary view illustrating the spring for returning the meat-supporting member to initial position.

Referring first to Figs. 1 and 2, 3 indicates a plurality of rotary disk knives for slitting the meat, said knives being mounted on a knife shaft 4 which is journaled in uprights 5, 6, rising from the frame 7 of the machine. The knives are given their rotative movement by means of a motor 8 which is located in a motor chamber 9 with which the frame 7 is provided, said motor having at driving pulley 10 on its shaft 11, which pulley is connected by a driving belt 12 to a pulley 13 fast on the knife shaft 4.

The slice of meat, which is indicated in dotted lines 14 in Fig. 1, is fed to the knives by means of a reciprocatory meat-supporting member which on its forward movement delivers the slice of meat 14 to the knives, said member being acted upon by a spring which automatically turns the meat-supporting member to its initial position. In the construction shown in Figs. 1 and 2, the meat-supporting member is in the form of a flexible apron 15, one end 18 of which is secured to a roll 16, and the other end 19 of which is fast to the periphery of the roll 17. The roll 16 is carried by a shaft 20 which is journaled in two side rails 21 that are carried by the frame, and are situated between the uprights 5, 6. One side rail may be secured to the upright 5, and the other side rail is shown as mounted on ears 22 with which the frame 7 is provided, said rail being secured to the ears by clamping bolts 23. The roll 17 is carried by a shaft 24 which is journaled in the side rails 21.

Situated beneath the apron 15 and directly beneath the knives 3 is an apron support which comprises a sleeve 25 that is freely rotatable on a rod 26 that is mounted in ears 27 with which the side rails 21 are provided.

Means are provided for feeding the meat-supporting apron 15 forwardly in the direction of the arrow, Fig. 1, a sufficient distance to carry the slice of meat 14 to and past the knives 3, and means are also provided for automatically returning the apron to its initial position after it has reached the limit of its forward movement.

The apron-feeding means herein shown comprises a sprocket wheel 28 on the roll shaft 20 and which is operated by a sprocket chain 29 that extends underneath and in operative engagement with a sprocket wheel 30 on the knife shaft 4, the sprocket chain 29 passing around an idler sprocket wheel 31 which is mounted on a shaft 32 carried by the upstanding bracket arm 33.

With this construction, the rotation of the knife shaft in a clockwise direction, as shown by the arrow in Fig. 1, will actuate the sprocket chain, thereby to rotate the sprocket wheel 28 in a counterclockwise direction.

The sprocket wheel 28 is loosely mounted on the roll shaft 20, and a clutch is provided for clutching said sprocket wheel to the shaft, thereby to rotate the roll 16 in a counterclockwise direction whenever a slice of meat is to be fed to the knives. Such rotation of the roll 16 will wind the flexible apron 15 about the roll, thereby moving the apron forward, and during this movement the other or righthand end of the apron is gradually being unwound from the roll 17. The slice 14 of meat is thus fed to the knives by winding one end of the apron 15 onto the roll 16 and simultaneously unwinding the other end of the apron from the roll 17. The clutch for connecting the sprocket wheel 28 to the shaft 20 comprises two clutch members 34, 35. The clutch member 34 is rigid with the sprocket wheel 28 and the clutch member 35 is in the form of a sleeve which is splined to the shaft 20 but movable longitudinally thereof. This movable clutch member 35 is provided with a peripheral groove 36 in which is received the forked end 37 of a clutch-actuating member 38 that is mounted on a rock shaft 39 which is supported in bearings 40 carried by the upright 6. This rock shaft 39 has at one end an actuating arm 41 by which the rock shaft can be turned to throw the clutch into and out of engagement.

It will be understood that the knives 3 are rotating continuously, but when the clutch members 34, 35 are disengaged then the meat-feeding apron 15 will be stationary.

When a slice 14 of meat is to be slit, said slice will be placed on the receiving end and the then stationary apron 15 as shown in dotted lines, Fig. 1, and the operator will then actuate the arm 41 to throw the clutch into engagement. The roll 16 will then be rotated thereby winding the end 18 of the apron thereon and advancing the apron toward the left, Fig. 1, such movement of the apron carrying the slice of meat forwardly into position to be acted on by the knives 3. The relative size of the sprocket wheels 30 and 28 is such that the forward feeding movement of the apron is slower than the peripheral speed of the knives 3 so that the knives will act on the meat with a draw cut.

Means are provided for automatically disengaging the clutch members 34, 35, and thus terminating the forward feeding movement of the apron when a slice of meat has been fed by the apron past the knives and is about to be delivered therefrom.

Means are also provided for automatically returning the apron to the initial position shown in Fig. 1 by re-winding the end 19 of the apron on the roll 17 whenever the clutch is thus disengaged.

For disengaging the clutch automatically, there is provided a clutch-tripping member or dog 42 which is pivotally mounted at 43 on a bracket 44 formed on the frame. This dog 42 has an arm 45 adapted to engage an extension 46 with which the clutch-actuating member 38 is provided. This dog 42 is provided with a foot 47 which is situated above one edge of the apron 15 and said apron is formed with a cam projection 48 that is adapted to engage the foot 47 as the apron reaches the forward end of its feeding movement, as indicated in dotted lines, Fig. 1. The engagement of this projection 48 with the foot 47 will rock the dog 42 from the position shown in Fig. 2 to that shown in Fig. 3, and during this rocking movement, the tail 45 of the dog will engage the extension 46 of the clutch-actuating member 38, thereby rocking the latter and disengaging the clutch, as shown in Fig. 3, thereby terminating further forward feeding movement of the apron.

The roll 17 is acted upon by a suitable spring 49 which acts in opposition to counterclockwise movement of said roll 17, said spring being wound up or placed under increased tension by the counterclockwise turning movement of the roll 17 as the apron 15 is unwound therefrom. This spring 49 is located in a recess 92 formed in the end of the roll 17, and one end is anchored to the adjacent side rail 21, as seen at 94, and the other end is secured to the roll, as seen at 93.

As soon as the clutch is disengaged, the spring 49 acts automatically to rotate the roll 17 in a clockwise direction, thereby winding up the end 19 of the apron thereon and thus returning the apron to its initial position, shown in Fig. 1.

The dog 42 is acted on by a spring 50 which is confined between the tail 45 of the dog and the overhanging portion 51 of the bracket arm 44, said spring operating through the dog 42 to hold the clutch disengaged while the apron is being returned to its initial position and until the operator actuates the handle 41 to again throw the clutch into engagement. When the clutch is thrown into engagement, the spring 50 is compressed somewhat, but by making the clutch teeth 52, 53, slightly undercut, as shown in Figs. 2 and 3, said clutch teeth will be maintained in engagement by the load on the clutch resulting from moving the apron 15 forwardly against the action of the spring 49.

52 indicates a delivery apron carried by the side rails 21 and operating to receive the slit slice of steak 14 as it is delivered from the apron 15.

The apron support 25 is shown as vertically adjustable so as to provide for cutting slits of different depths in the meat. For this purpose the rod 26 is provided at each end with an eccentric hub 53a, one of said hubs being journaled in the ear 27 and the other in the upright 5. This rod is provided at one end with a finger piece 54 which is pivotally mounted thereon at 55, said finger piece providing means for turning the rod and thereby causing the portion of the apron 15 directly beneath the knives to be raised and lowered due to the eccentric relation between the body of the rod and the hubs 53a.

The finger piece 54 is provided with a projection 56 adapted to enter any one of a number of holes 57 formed in the upright 5, thereby to lock the rod 26 in any adjusted position.

I claim:

1. A meat-slitting machine comprising a set of rotary knives, means to rotate the knives, a reciprocating meat-supporting member in the form of a flexible apron, means to give the apron a feeding movement thereby to feed to the knives a slice of meat supported thereon, and a spring to give the apron a return movement to initial position.

2. A meat-slitting machine comprising a set of rotary knives, means to rotate the knives, a meat-supporting member in the form of a flexible apron, a roll to which said apron is secured, means to rotate said roll thereby to wind the apron thereon and give it a forward feeding movement by which a slice of meat supported on the apron may be fed to the knives, and a spring to return the apron to initial position.

3. A meat-sliting machine comprising a set of rotary knives, means to rotate the knives, a meat-supporting member in the form of a flexible apron, two rolls to which said apron is secured, means to rotate one roll, thereby to wind the apron thereon and give it a forward feeding movement, and a spring acting on the other roll to return the apron to initial position.

4. A meat-slitting machine comprising a set of rotary slitting knives, means to rotate the knives, a meat-supporting member in the form of a flexible apron, two rolls to which said apron is secured, means to rotate one roll, thereby to wind the apron thereon and give it a forward feeding movement, said apron meanwhile being unwound from the other roll, and a spring acting on said other roll in opposition to its unwinding movement and operating automatically to rotate said other roll, thereby wind the apron thereon and return it to initial position.

5. A meat-slitting machine comprising a set of rotary slitting knives, means to rotate the knives, a meat-supporting member in the form of a flexible apron, two rolls to which said apron is secured, means including a clutch to rotate one roll thereby to wind the apron thereon and give it a forward feeding movement, said apron meanwhile being unwound from the other roll, means to disengage said clutch at the end of the forward feeding movement, and a spring acting on the other roll to rewind the apron thereon and thus return it to initial position.

6. A meat-slitting machine comprising a set of rotary slitting knives, means to rotate the knives, a meat-supporting member in the form of a flexible apron, two rolls to which said apron is secured, means including a clutch to rotate one roll thereby to wind the apron thereon and give it a forward feeding movement, said apron meanwhile being unwound from the other roll, means actuated by the forward movement of the apron to disengage the clutch at the end of the feeding movement, and a spring acting on the other roll to rewind the apron thereon when the clutch is disengaged.

7. A meat-slitting machine comprising a set of rotary slitting knives, means to rotate the knives, a meat-supporting member in the form of a flexible apron, two rolls to which said apron is secured, means to rotate one roll thereby to wind the apron thereon and give it a forward feeding movement, said apron meanwhile being unwound from the other roll, a spring acting on said other roll to return the apron to initial position, and means to adjust the apron toward and from the knives.

8. A meat slitting machine comprising a set of rotary knives, means to rotate the knives, a meat-supporting member in the form of a flexible apron, a roll to which said apron is secured, means to rotate said roll, thereby to wind the apron thereon and give it a forward feeding movement, and automatically operative means to return the apron to initial position.

9. A meat slitting machine comprising a set of rotary slitting knives, means to rotate the knives, a meat-supporting member in the form of a flexible apron, a roll to which said apron is secured, means including a clutch to rotate said roll, thereby to wind the apron thereon and give it a forward feeding movement, means to disengage the clutch at the end of the forward feeding movement, and automatically operative means to return the apron to initial position when the clutch is disengaged.

10. A meat slitting machine comprising a set of rotary slitting knives, means to rotate the knives, a meat-supporting member in the form of a flexible apron, a roll to which said apron is secured, means including a clutch to rotate said roll thereby to wind the apron thereon and give it a forward feeding movement, means actuated by the forward movement of the apron to disengage the clutch, and automatically operative means to return the apron to initial position when the clutch is disengaged.

JOSEPH P. SPANG.